(12) United States Patent
Manuel et al.

(10) Patent No.: US 12,075,023 B2
(45) Date of Patent: Aug. 27, 2024

(54) METHOD AND SYSTEM FOR ASSESSING AUDIO AND VIDEO QUALITY OF A MULTIMEDIA CONTENT

(71) Applicant: L&T TECHNOLOGY SERVICES LIMITED, Chennai (IN)

(72) Inventors: Sumanth Roshan Raj Manuel, Bangalore (IN); Murugan Ramasamy, Chennai (IN); Nisha Rai, Kolkata (IN)

(73) Assignee: L&T TECHNOLOGY SERVICES LIMITED, Chennai (IN)

(*) Notice: Subject to any disclaimer, the term of this patent is extended or adjusted under 35 U.S.C. 154(b) by 327 days.

(21) Appl. No.: 17/551,229

(22) Filed: Dec. 15, 2021

(65) Prior Publication Data

US 2022/0408078 A1    Dec. 22, 2022

(51) Int. Cl.
*H04N 17/00* (2006.01)
*G06T 7/00* (2017.01)
*H04N 23/60* (2023.01)

(52) U.S. Cl.
CPC ........... *H04N 17/00* (2013.01); *G06T 7/0002* (2013.01); *H04N 17/004* (2013.01); *H04N 23/64* (2023.01); *G06T 2207/10016* (2013.01); *G06T 2207/30168* (2013.01)

(58) Field of Classification Search
CPC .... H04N 17/00; H04N 17/002; H04N 17/004; H04N 19/154; H04N 23/45; H04N 23/62–635; H04N 23/667; H04N 25/42; H04N 25/60; H04N 25/683; G06T 7/0002; G06T 2207/10016; G06T 2207/30168
See application file for complete search history.

(56) References Cited

U.S. PATENT DOCUMENTS

| | | | | |
|---|---|---|---|---|
| 6,741,277 B1* | 5/2004 | Rau | ....................... | H04N 17/004 348/E17.005 |
| 2008/0192129 A1* | 8/2008 | Walker | .................... | H04N 23/66 348/231.2 |
| 2009/0274390 A1* | 11/2009 | Meur | ................... | H04N 17/004 382/275 |
| 2015/0379373 A1* | 12/2015 | Bhatia | ................... | G06V 10/758 382/197 |
| 2017/0201745 A1* | 7/2017 | Abramov | ............... | G06T 7/0002 |
| 2018/0082416 A1* | 3/2018 | Arulesan | ................ | H04N 23/64 |
| 2018/0286032 A1* | 10/2018 | Bovik | ................... | G06T 7/0002 |
| 2022/0101123 A1* | 3/2022 | Kim | ...................... | G06V 10/993 |

* cited by examiner

*Primary Examiner* — Twyler L Haskins
*Assistant Examiner* — Akshay Trehan
(74) *Attorney, Agent, or Firm* — Kendal M. Sheets

(57) ABSTRACT

A method and a system for assessing quality of multimedia content are disclosed. In an embodiment, the method may include receiving a multimedia content which may be captured from a media device. The method may further include generating a plurality of frames from the multimedia content, based on an attribute associated with the multimedia content. The method may further include determining, for each frame, a set of parameter quality scores corresponding to a set of quality parameters, and calculating an overall quality score for the multimedia content based on the set of parameter quality scores for each of the plurality of frames associated with the multimedia content.

19 Claims, 7 Drawing Sheets

METHOD AND SYSTEM FOR ASSESSING AUDIO AND VIDEO QUALITY OF A MULTIMEDIA CONTENT

TECHNICAL FIELD

This disclosure relates generally to multimedia quality assessment, and more particularly relates to system and method for assessing audio and video quality of a multimedia content.

BACKGROUND

Multimedia services have become highly popular among masses. For example, the multimedia services may include video streaming applications, digital television broadcasts, and live audio and video services over the Internet. The assessment of the multimedia services, particularly in terms of delivered Quality of Experience (QoE) becomes important for quality assessment of the multimedia content. Different types of video quality assessment methods such as a full reference (FL) method or a no-reference (NR) method may be employed to assess the quality of the multimedia content.

However, these assessment methods may not take into account various quality assessment parameters, and therefore, may not be able to provide a comprehensive quality assessment. Further, the existing video quality assessment systems are platform-dependent and Operating System (OS) dependent.

Accordingly, there is a need for platform-independent and an OS-independent techniques for assessing quality, especially video and audio quality, of a multimedia content, based on audio and video quality parameters.

SUMMARY OF THE INVENTION

In one embodiment, a method of assessing quality of multimedia content is disclosed. The method may include receiving a multimedia content which may be captured from a media device. The method may further include generating a plurality of frames from the multimedia content, based on an attribute associated with the multimedia content. The method may further include determining, for each frame, a set of parameter quality scores corresponding to a set of quality parameters and calculating an overall quality score for the multimedia content based on the set of parameter quality scores for each of the plurality of frames associated with the multimedia content.

In another embodiment, a system for assessing quality of a multimedia content is disclosed. The system may include a processor and a memory communicatively coupled to the processor. The memory may be configured to store processor-executable instructions. The processor-executable instructions, on execution, cause the processor to receive a multimedia content which may be captured from a media device and generate a plurality of frames from the multimedia content, based on an attribute associated with the multimedia content. The processor-executable instructions, on execution, may further cause the processor to determine, for each frame, a set of parameter quality scores corresponding to a set of quality parameters, and calculate an overall quality score for the multimedia content based on the set of parameter quality scores for each of the plurality of frames associated with the multimedia content.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Figure 1:
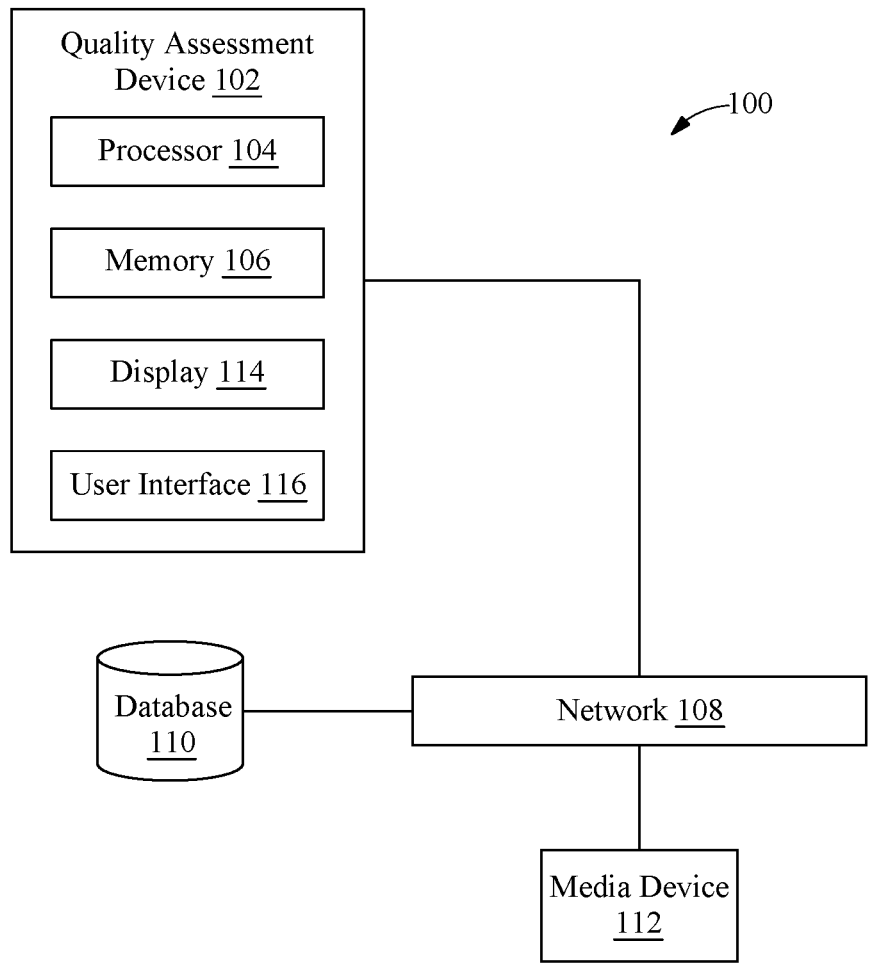
FIG. 1 is a block diagram of an environment for assessing quality of a multimedia content, in accordance with some embodiments of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed.

With the rising coverage of the internet and usage of mobile devices, usage of multimedia content has increased over time. There is a need for the assessment of user experience on the multimedia content, especially video content. The quality of videos may get degraded during capturing, compression, transmission, reproduction, and displaying due to distortions. To this end, a method and system for assessing quality of multimedia content, for example, videos, are disclosed. By way of an example, the video may be a file-based video or streaming on-the-fly video. Assessing audio-video quality may be critical for various video processing applications, such as, without limitation, compression, communication, printing, analysis, registration, restoration, and enhancement.

Exemplary aspects of the disclosure provide a method and a system that identifies a plurality of video quality metrics (parameters) to monitor video quality for quality control systems. Exemplary aspects of the disclosure further provide for a method and a system that evaluates or assesses the in-depth quality of the video being streamed or telecasted.

Exemplary aspects of the disclosure further provide for a method and a system that evaluates or assesses audio in the video based on key metrics, as the quality of audio in any video is as important as the video quality. Exemplary aspects of the disclosure further provide for a method and a system that may be completely OS and platform-independent, and therefore is capable of supporting multiple OS and cloud environments. The disclosed method and system are capable of analyzing video quality for both 'full-reference' multimedia and 'no-reference' multimedia, in contrast to conventional method and systems that do quality analysis only for either of the one. The disclosed method and system are capable of providing in-depth analysis on each frame at the pixel level of the video and can be used in video encryption enhancement to verify Adaptive Bit-Rate (ABR) effectiveness.

The disclosed method and system are capable of assessing video quality for high-definition videos as well as its audio quality. In accordance with another embodiment, the disclosed method and system may be capable of assessing individual audio files for quality assessment. The disclosed method and system may be designed to help and equip both live video streaming and live video conferencing platforms. The disclosed method and system may be capable of generating reports that are designed in such a way that it is easy for an end-user to point at a particular frame where there is a dip in video quality of the video, and therefore are user-friendly. The disclosed method and system are capable of providing all technical quality parameters of a live video along with all external factors associated with the quality of live video streaming and viewing experience.

Referring now to FIG. 1, a block diagram of an environment 100 for assessing quality of a multimedia content is illustrated, in accordance with some embodiments of the present disclosure. As shown in FIG. 1, the environment 100 may include a quality assessment device 102. The quality assessment device 102 may be coupled to a database 110 and a media device 112 over a communication network 108.

The quality assessment device 102 may be configured to receive a multimedia content from the database 110 and/or the media device 112. In particular, quality assessment device 102 may receive the multimedia content which is stored in the database 110. Alternatively, the quality assessment device 102 may directly capture in real-time the multimedia content which is being played on the media device 112. By way of an example, the media device 112 may include a smart phone, a Set-Top-Box (STB), a television (TV) unit, etc. As such, in accordance with some embodiments, the quality assessment device 102 may be configured to have built-in audio and video capturing capability. It should be noted that in some embodiments, the quality assessment device 102 may be provided within the media device 112 itself.

The quality assessment device 102 may be able to assess both a file-based multimedia content (stored on the database 110) and further capture the multimedia content on-the-fly (i.e. live streaming). Further, the quality assessment device 102 may have the capability of assessing both full-reference multimedia content and no-reference multimedia content. As will be appreciated by those skilled in the art, the full-reference multimedia content may refer to the multimedia content for which the corresponding source multimedia content is available along with the multimedia content which is to be assessed. Further, the no-reference multimedia content may refer to the multimedia content for which the corresponding source multimedia content is not available.

The quality assessment device 102 may be configured to perform one or more functionalities, which may include receiving the multimedia content, the multimedia content being captured from the media device 112. The one or more functionalities may further include generating a plurality of frames or sequences from the multimedia content, based on an attribute associated with the multimedia content. The one or more functionalities may further include determining for each frame or sequence, a set of parameter quality scores corresponding to a set of quality parameters and calculating an overall quality score for the multimedia content based on the set of parameter quality scores for each of the plurality of frames or sequence associated with the multimedia content.

In order to perform the above-discussed functionalities, the quality assessment device 102 may include a processor 104 and a memory 106. The processor 104 may include suitable logic, circuitry, interfaces, and/or code that may be configured to assess the quality of the multimedia content. The processor 104 may be implemented based on temporal and spatial a number of processor technologies, which may be known to one ordinarily skilled in the art. Examples of implementations of the processor 104 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

The memory 106 may include suitable logic, circuitry, and/or interfaces that may be configured to store instructions executable by the processor 104. The memory 106 may store instructions that, when executed by the processor 104, may cause the processor 104 to assess the quality of the multimedia content. The memory 106 may be a non-volatile memory or a volatile memory. Examples of non-volatile memory may include, but are not limited to a flash memory, a Read-Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM). The memory 106 may also store various data that may be captured, processed, and/or required by the system.

The quality assessment device 102 may further include a display 114 and a user interface 116. By way of an example, the user interface 116 may include a touchscreen, a keyboard, etc. to receive user inputs. For example, the user input may include selection of one or parameters (i.e. set of quality parameters) from a plurality of quality parameters, for example by clicking on a checkbox associated with each quality parameter. Further, the display 114 may include a display screen which is capable of displaying a report in a tabular or a graphical format that may represent the set of parameter quality scores for each frame associated with the multimedia content and the overall quality score for the multimedia content.

The communication network 108 may include a communication medium through which the quality assessment device 102, the database 110, and the media device 112 may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 108, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The database 110 may include suitable logic, circuitry, and/or interfaces that may be configured to store data, or application-specific information, such as logs and application-specific databases. By way of an example, the database 110 may store file-based multimedia content, i.e. the multimedia content already captured from the media device 112.

The media device 112 may include a mobile phone device, a Set-Top-Box (STB), or a television (TV) unit. The media device 112 may be configured to store or play multimedia content, such as, a video clip or an audio clip. Further, the video clip may be encoded or unencoded. In accordance with some embodiments, the media device 112 may include a video encoder conforming to MPEG-2, MPEG-4, or other video encoding protocols. In accordance with some embodiments, the media device 112 may receive a video clip provided by some other content source (e.g., a live video stream from a television studio, satellite feed, and the like).

Figure 2:
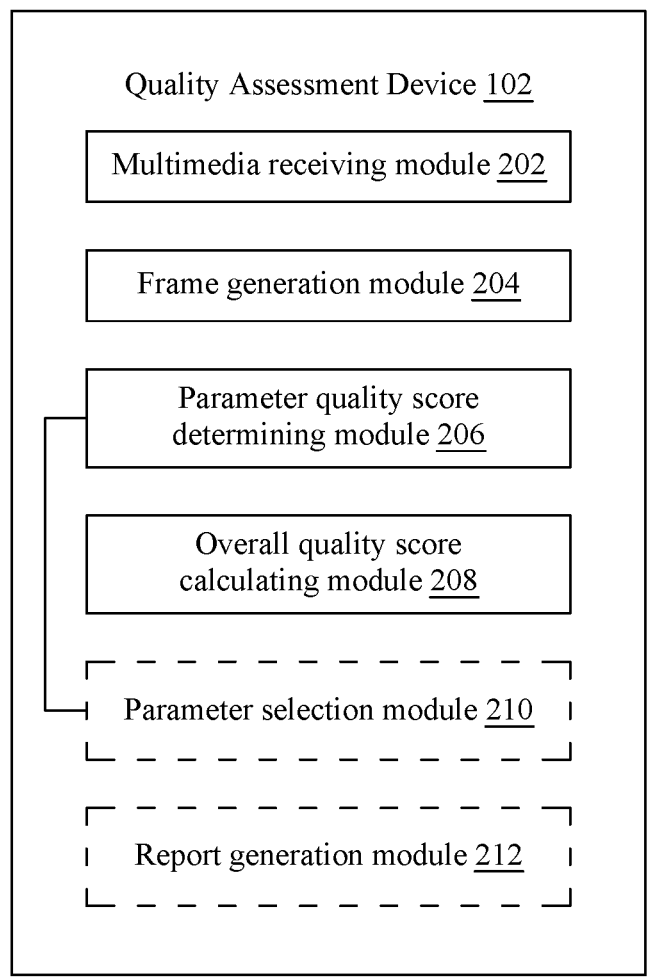
FIG. 2 is a functional block diagram of a quality assessment device, in accordance with some embodiments of the present disclosure.

Referring now to FIG. 2, a functional block diagram 200 of the quality assessment device 102 is illustrated, in accordance with some embodiments of the present disclosure. The quality assessment device 102 may include a multimedia content receiving module 202, a frame generating module 204, a parameter quality score determining module 206, and an overall quality score calculating module 208. Additionally, the quality assessment device 102 may include a parameter selection module 210, and a report generation module 212.

The multimedia content receiving module 202 may receive the multimedia content, for example, from the database 110 or the media device 112. For example, when the multimedia to be assessed may be file-based and stored in the database 110, and the same may be retrieved by the multimedia content receiving module 202 from the database. Alternatively, the multimedia to be assessed may be received by the multimedia content receiving module 202 directly from the media device 112.

The frame generating module 204 may generate a plurality of frames from the multimedia content received by the multimedia content receiving module 202. It should be noted that frames may be understood to also mean sequence (of images). In some embodiments, the multimedia content may include a video clip or a set of images. The frame generating module 204 may generate the plurality of frames based on an attribute associated with the multimedia content. By way of an example, the attribute associated with the multimedia content may include a size and a time duration of the multimedia content. As such, in order to generate the plurality of frames, the frame generating module 204 may determine frames per second (FPS) for the multimedia content based on the attribute associated with the multimedia content. Further, the frame generating module 204 may generate the plurality of frames based on the FPS for the multimedia content.

In some embodiments, the parameter selection module 210 may select a set of quality parameters from a plurality of predefined quality parameters, based on a user input. It should be noted that the user may be provided an access to the plurality of parameters. Further, the user may be provided an option to select from the plurality of parameters, a set of the parameters which the user is interested in. The plurality of parameters may be displayed to the user via the user interface 116, and the user may select a set of parameters by clicking on a checkbox associated with the respective parameter. For example, the user may be provided access to twenty parameters, and eventually the user may select any number of parameters from these twenty parameters, to access the quality of the multimedia content.

The parameter quality score determining module 206 may determine a set of parameter quality scores for each frame of the plurality of frames, corresponding to a set of quality parameters. In other words, the parameter quality score determining module 206 may assess the quality of the frame with respect to each parameter of the set of the parameters, and determine a parameter quality score corresponding to each of those parameters.

By way of an example, the plurality of quality parameters may include a plurality of video quality parameters and a plurality of audio quality parameters. The plurality of video quality parameters may include a mean squared error (MSE), a peak signal to noise ratio (PSNR), a signal to noise ratio (SNR), a structure similarity index (SSIM), a mean-squared-error (MSE), a maximum absolute value (MAE), an aspect ratio, a Pearson's correlation coefficient (PCC), a brightness, a contrast, a blurriness, a blackness, and a mean absolute difference (MAD) for the video.

In some embodiments, the plurality of video quality parameters may further include a spatial perceptual information (SI) parameter and a temporal perceptual information (TI) parameter. The SI parameter and the TI parameter may be consistent, and the perceived quality after compression may be expected to be effectively the same across all frames. As will be appreciated, the SI parameter and the TI parameter may be key metrics to verify the video compression effectiveness.

It should be noted that the MSE may be used to assess how well a method to reconstruct an image performs relative to the original image. The MAE may relate to difference between original image and compressed image. The aspect ratio of a frame may describe the proportional relationship between its width and its height. PCC(Orig) is used in statistical analysis, pattern recognition, and image processing, and is based on comparison of two images (i.e. an original image and a referenced image) for image alignment purposes and disparity measurement. PCC(orig vs ref) can take a range of values from +1 to −1. As will understood, a higher value indicates better quality. The brightness parameter may refer to the overall lightness or darkness of the frame. The contrast may be the difference in brightness between objects or regions in the frame. The blurriness parameter may be based on blur effect-perception and estimation with a new no-reference perceptual blur metric. The blackness parameter may relate to number of dark pixels in the image. The MSAD is the mean absolute difference of the color components in the correspondent points of image, and may be used for testing codecs and filters. Further, the MSAD may be a measure of the similarity between image blocks.

The plurality of audio quality parameters may include a root mean square (RMS), an amplitude, a peak signal to noise ratio (PSNR), and a mean squared error (MSE) for the audio. As will be appreciated, the RMS may measure the effective average value of an audio signal as well as the perceived dynamic range values of that signal. The amplitude of a periodic variable may be a measure of original audio change over a single period. The PSNR may be based on peak signal to noise ratio of an original file and a reference file.

The overall quality calculating module 208 may calculate an overall quality score for the multimedia content based on the set of parameter quality scores for each of the plurality of frames associated with the multimedia content. As such, the overall quality score may be calculated using the set of parameter quality scores for each frame. In some embodiments, the overall quality calculating module 208 may apply a weightage to each parameter quality score of the set of parameter quality scores for each frame and calculate the overall quality score based on the set of parameter quality scores and the corresponding weightages.

By way of an example, the quality parameters of PSNR, SNR, and SSIM combined may be assigned a weightage of 40%. Further, the quality parameters of MSE, RMS, MAE, and MSAD combined may be assigned a weightage of 40%. Furthermore, quality parameters of PCC, PCC_ORG, SI, and TI combined may be assigned a weightage of 20%.

In some embodiments, the report generation module 212 may generate a report based on the set of parameter quality scores for each frame and the overall quality score for the multimedia content. By way of an example, the report may include a representation of the set of parameter quality scores for each frame associated with the multimedia content. The report may further include a representation of the overall quality score for the multimedia content.

Figure 3:
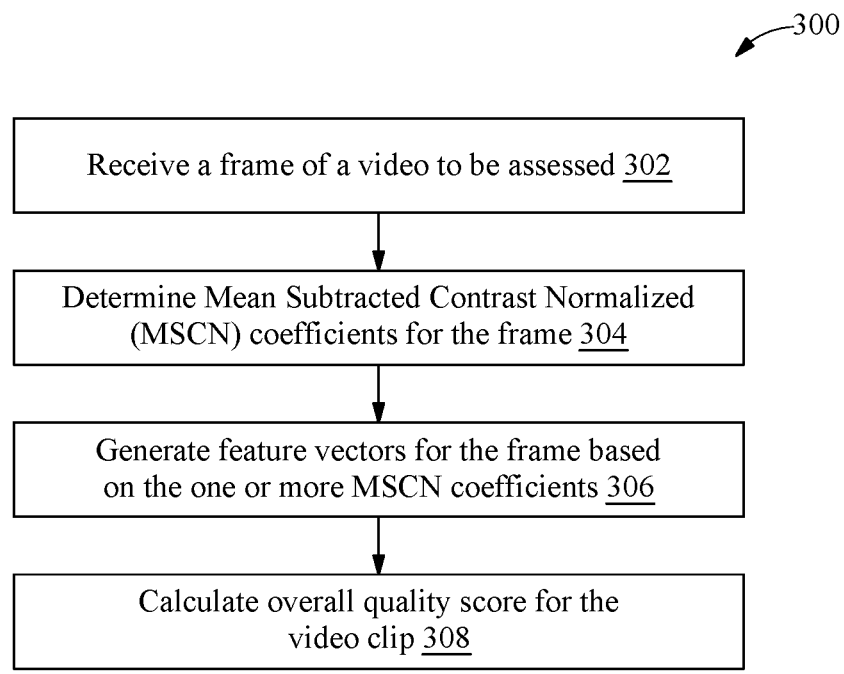
FIG. 3 is a process flow diagram of a process of assessing quality of a no-reference video clip, in accordance with some embodiments of the present disclosure.

Referring now to FIG. 3, a process flow diagram of a process 300 of assessing quality of a no-reference video clip is illustrated, in accordance with some embodiments of the present disclosure. It should be noted that in order to assess the quality of a video clip, the original/source video may not be necessary. The process 300 may be based on machine learning model, for example, a Python-based machine learning model. The process 300 may be useful especially in multimedia services in the context of wireless communications and telecommunication systems.

At step 302, a frame of the video clip which is to be assessed may be received. As mentioned above, a plurality of frames may be generated from the video clip, by determining a frames per second (FPS) for the video clip based on the attribute associated with the video clip and generating the plurality of frames based on the FPS for the video clip. The attribute associated with the video clip may include a size and a time duration of the video clip.

At step 304, one or more Mean Subtracted Contrast Normalized (MSCN) coefficients may be determined for the frame. In some embodiments, in order to determine the one or more MSCN coefficients, a distorted image may be created from the frame, by adding noise to the frame. Thereafter, one or more MSCN coefficients on local spatial neighborhoods of the frame may be determined based on a comparison of the distorted image and the corresponding frame.

At step 306, feature vectors may be generated for the frame based on the one or more MSCN coefficients. Finally, at step 308, the overall quality score for the video clip may be calculated using the feature vectors. The steps 304 and 306 may be repeated for the plurality of frames of the video clip, to thereby determine a plurality of feature vectors for the video clip.

At step 308, a quality score may be computed using the plurality of feature vectors. In particular, the plurality of feature vectors may be fed to the Python-based machine learning model. It should be noted that this Python-based machine learning model may have been trained using training data corresponding to the video clip which is to be assessed. For example, the training data may include a plurality of frames of a plurality of video clips along with corresponding true overall quality score. Therefore, at step 308, the quality score for the video clip may be obtained from the Python-based machine learning model.

Figure 4:
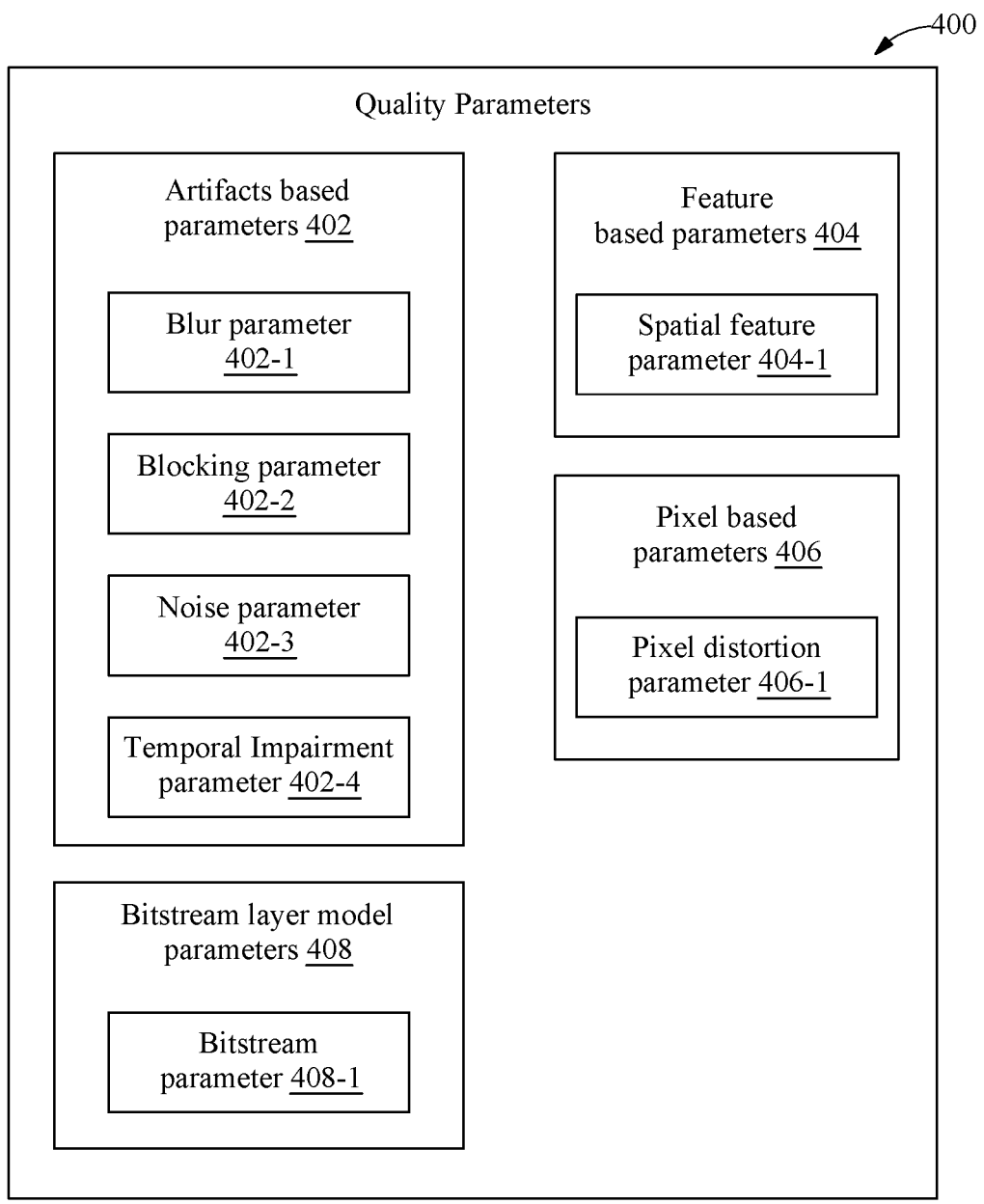
FIG. 4 is a block diagram showing classification of the plurality of quality parameters for assessing a multimedia content, in accordance with some embodiments of the present disclosure.

Referring now to FIG. 4, a block diagram 400 showing classification of the plurality of quality parameters for assessing a multimedia content is illustrated, in accordance with some embodiments of the present disclosure. It should be noted that plurality of quality parameters may be classified in one or more categories. For example, the plurality of parameters may be distributed among the one or more categories when being displayed to the user via the user interface 116. Further each of the plurality of quality parameters may be provided alongside an associated checkbox. Further, each the one or more categories (i.e. category names) may also be provided alongside an associated checkbox. The user may therefore, select the set of quality parameters by clicking in (i.e. checking) the checkboxes associated with the set of quality parameters. Optionally, the user may select all the quality parameters lying under one category, by clicking on (i.e. checking) checkbox associated with the respective category.

By way of an example, as shown in FIG. 4, the one or more categories may include an artifacts-based parameters category 402, a feature-based parameters category 404, a pixel-based parameters category 406, and a bitstream layer model category 408. Further, the artifacts-based parameters category 402 may include a blur parameter 402-1, a blocking parameter 402-2, a noise parameter 402-3, and a temporal impairment parameter 402-4. For example, it should be noted that a single artifact-based parameter may not result in satisfactory assessment of the overall quality. Therefore, multiple artifact-based parameters are provided, for a user to select a combination of two or more artifact-based parameters for carrying out the assessment.

The feature-based parameters category 404 may include a spatial feature parameter 404-1. The feature-based parameters 404 may represent different characteristics of an image or a video and therefore can be used complementary to other parameters for making an estimate of the overall quality of the video. In accordance with some embodiments, the feature-based parameters 404 may include a local contrast parameter 404-1, a brightness parameter 404-2, a colorfulness parameter 404-3, and a structural activity parameter 404-4.

The pixel-based parameters category 406 may include a pixel distortion parameter 406-1. A frame with pixel distortions may be considered low quality. As such, some quality-relevant features can be computed from the frame/video pixels to formulate an estimation of the quality of the video.

The bitstream layer model category 408 may include a bitstream parameter 408-1. The quality parameters of the bitstream layer model category 408 may be based on certain features (such as spatial features and bitstream parameters). The quality features are indicative of the measurement of a physical quantity relevant for visual quality.

For example, video quality may be estimated from the various quality parameters, as mentioned above, to verify video compression effectiveness. Further, these quality parameters may also be used for noise evaluation, by using various filters. As will be understood, noise may correspond to a random variation of brightness or color information in an image (or a frame). Different techniques may be used to estimate different types of noise, such as salt and pepper noise, Gaussian noise, Poisson noise, and speckle noise. Mostly, the noise is considered to be an additive component, e.g., Gaussian noise, but in some situations, the noise component is multiplicative, e.g., speckle noise. Noise can be introduced during the image/video acquisition, recording, processing, and transmission. For noise evaluation, a mean square error (MSE) caused by block-based compression and a MSE caused by packet loss errors may be estimated.

Further, in some embodiments, discrepancies may be estimated from the plurality of frames of the video clip. For example, the discrepancies may include blurriness, blockness, etc. The blurriness may correspond to an artifact that appears as a loss of spatial detail and a reduction of edge sharpness. The blurriness may occur due to several reasons, such as origination during acquisition, processing, or compression. Further, edge distortion value of a frame of the video may be determined that may be used to find an estimate of a blur.

Figure 5:
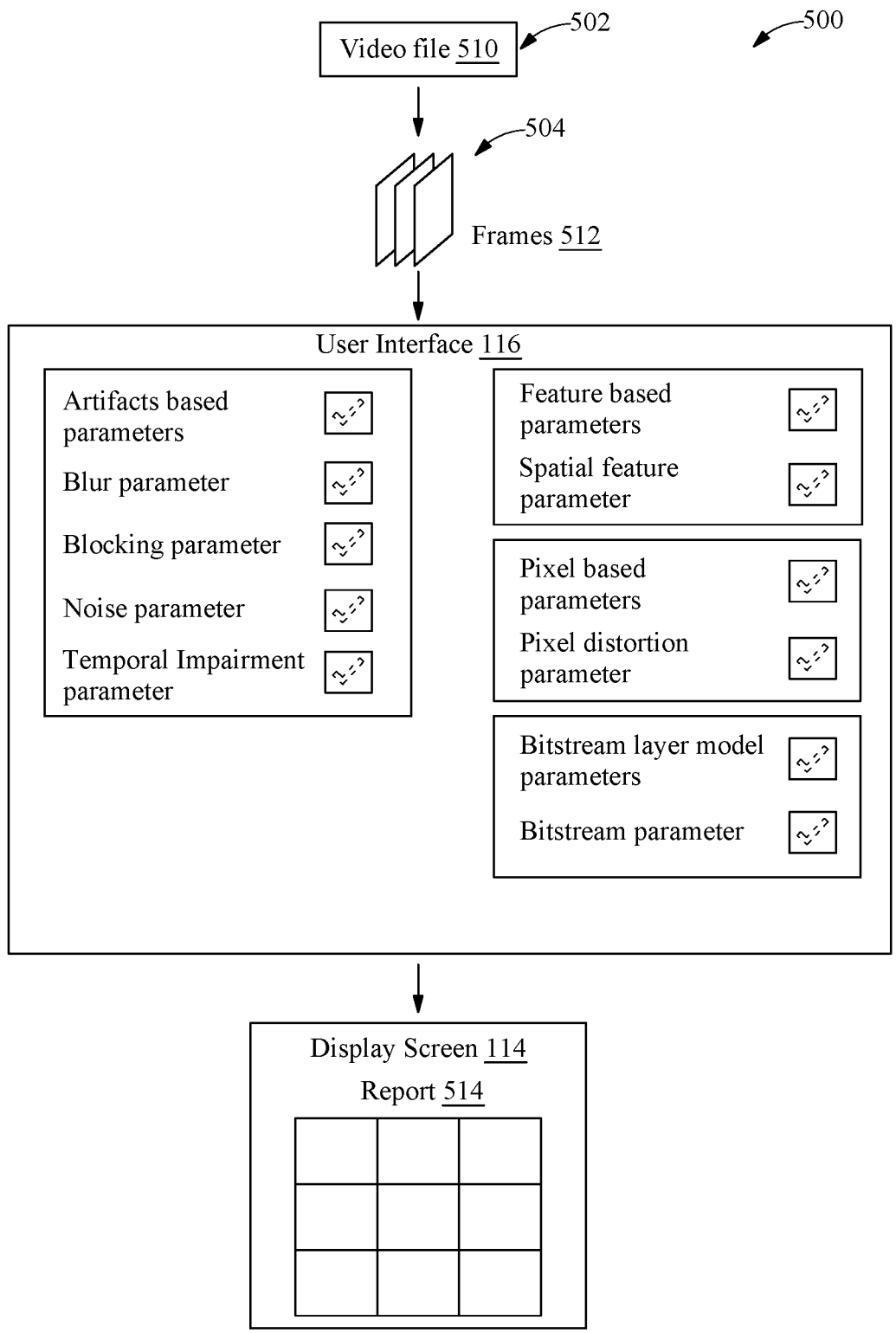
FIG. 5 is a process flow diagram of a process of assessing quality of a multimedia content, for example a view clip, in accordance with some embodiments.

Referring now to FIG. 5, a process flow diagram of a process 500 of assessing quality of a multimedia content, for example a view clip is illustrated, in accordance with some embodiments. At step 502, the multimedia content, for example. a video file 510 may be received. This video file 510 may be captured from a media device. At step 504, a plurality of frames or sequences 512 may be generated from the video file 510, based on an attribute associated with the video file 510. For example, the attribute may include a size and a time duration of the video file 510.

At step 506, for each frame or sequence, a set of parameter quality scores may be determined corresponding to a set of quality parameters. To this end, the set of quality parameters may be selected from a plurality of parameters which may be provided to a user via the user interface 116. Each of the plurality of quality parameters may be provided alongside an associated checkbox. The user may, therefore, select the set of quality parameters by clicking in (i.e. checking) the checkboxes associated with the set of quality parameters.

At step 508, an overall quality score for the video file 510 may be calculated based on the set of parameter quality scores for each of the plurality of frames or sequence associated with the video file 510, and displayed in form of a report 514. In some embodiments, the report 514 may be in a tabular format or a graphical format (i.e. bar graph, pie charts, etc.). For example, in the tabular format, the report 514 may include a representation of the set of parameter quality scores for each frame associated with the video file 510, along with a representation of the overall quality score for the video file 510.

Figure 6:
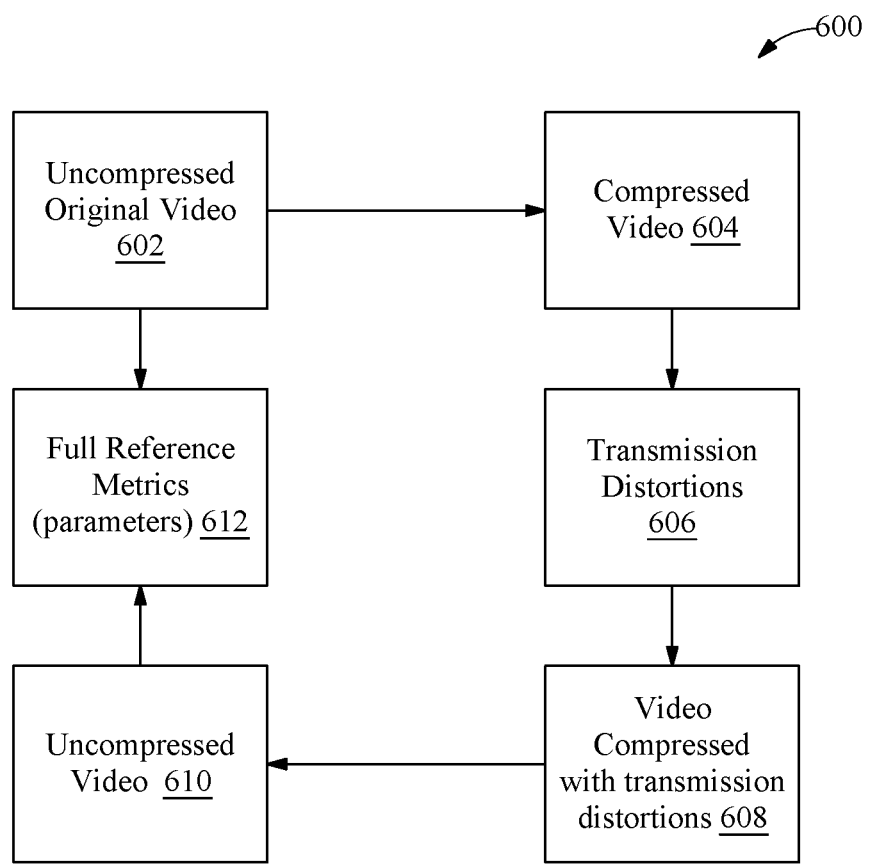
FIG. 6 is a process flow diagram of a process of assessing quality of a full-reference multimedia content, in accordance with some embodiments of the present disclosure.

Referring now to FIG. 6, a process flow diagram of a process 600 of assessing quality of a full-reference multimedia content is illustrated, in accordance with some embodiments of the present disclosure. With reference to FIG. 6, in a full-reference method, an original undistorted high-quality video (also referred to as uncompressed original video 602) may be compared to a degraded version (also referred to as compressed video 604) of the same video. For example, the comparison may be a pixel-by-pixel comparison or a block-based comparison.

As will be understood, the quality of the video may get degraded during transmission, due to the distortions that might occur at the transmission stage, referred as transmission distortions 606. The transmission distortions 606 may include noise that is introduced during the video transmission. The video may have been compressed with transmission distortions and referred to as video compressed with transmission distortions 608. As such, the video compressed with transmission distortions 608 may be uncompressed to obtain an uncompressed video 610 (with compression and transmission distortion).

In accordance with some embodiments, full reference metrics (i.e. parameters) 612 may be calculated from based on the comparison of the uncompressed original video 602 and the compressed video 604. For example, the full reference metrics 612 may include Peak Signal-to-Noise Ratio (PSNR), Structural Similarity (SSIM), Multi-scale SSIM, and Visual Signal-to-Noise Ratio (VSNR). The PSNR may be computed using the mean of the MSE vector (contains the Mean Square Error of each frame). The MSE may be computed per frame. The MSE may assess how well a method to reconstruct an image performs relative to the original image/frame. The implementation used may be based on MATLAB codes. The SSIM may be computed for each frame, and after that, an average value may be produced. The implementation used is an improved version of the original version in which the scale parameter of SSIM may be estimated. Further, a MS-SSIM may be computed for each frame, and after that an average value may be calculated. The implementation used may be based on MATLAB codes. Further, the VSNR may be computed using the total signal and noise values of the sequence. The signal and the noise values may be extracted to sum them separately. Here, luminance values may be considered. The VSNR may be obtained by dividing the total amount of signal by the total amount of noise. Further, maximum absolute value (MAE) may be calculated as a full-reference FR metric. The MAE may correspond to a difference between the original image and compressed image.

Figure 7:
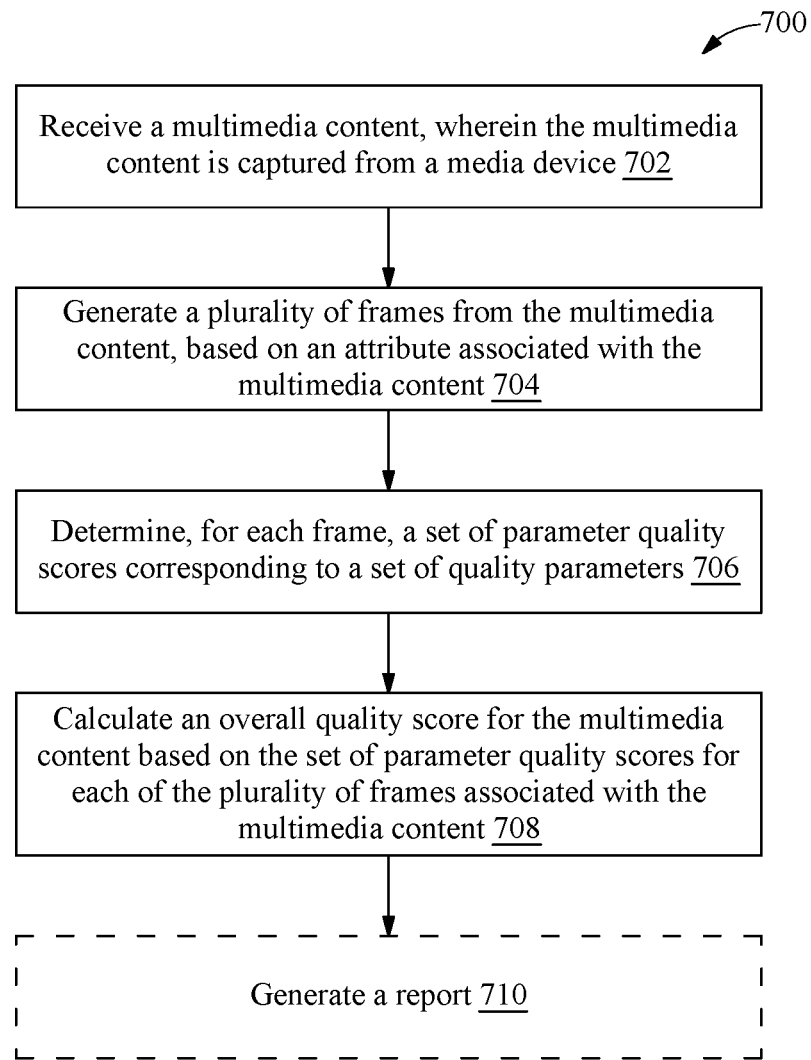
FIG. 7 is a flowchart of an exemplary method of assessing quality of a multimedia content, in accordance with an embodiment of the present disclosure.

Referring now to FIG. 7, a flowchart 700 of an exemplary method for assessing quality of a multimedia content is illustrated, in accordance with an embodiment of the present disclosure. The operations of the exemplary method may be executed by any computing device, for example, by the quality assessment device 102 of FIG. 1.

At step 702, a multimedia content may be received. In accordance with some embodiments, the multimedia content may be received from the media device 112. For example, the media device 112 may include a mobile phone device, a Set-Top-Box (STB), and a television (TV) unit. By way of an example, the multimedia content comprises one of a video clip and an image. Further, in accordance with an embodiment, the multimedia content may include at least one of: a file-based video and an on-the-fly video. The video may be streamed or telecasted.

At step 704, a plurality of frames may be generated. In accordance with some embodiments, the plurality of frames may be generated from the multimedia content, based on an attribute associated with the multimedia content. The attribute associated with the multimedia content may include a size and a time duration of the multimedia content. Further, generating the plurality of frames may include determining frames per second (FPS) for the multimedia content, based on the attribute associated with the multimedia content, and then generating the plurality of frames based on the FP At step 706, a set of parameter quality scores may be determined. In accordance with an embodiment, the set of parameter quality scores may be determined corresponding to a set of quality parameters. The set of quality parameters may be selected from a plurality of predefined quality parameters, based on user input. In accordance with an embodiment, the set of quality parameters comprises one or more of full reference quality parameters, no-reference quality parameters, spatial information parameters, and temporal information parameters.

In particular, by way of an example, the plurality of quality parameters may include a plurality of video quality parameters. The plurality of video quality parameters may include a mean squared error (MSE), a peak signal to noise ratio (PSNR), a signal to noise ratio (SNR), a structure similarity index (SSIM), a mean-squared-error (MSE), a maximum absolute value (MAE), an aspect ratio, a Pearson's correlation coefficient (PCC), a brightness, a contrast, a blurriness, a blackness, and a mean absolute difference (MAD) for the video. The plurality of quality parameters may further include a plurality of audio quality parameters. The plurality of audio quality parameters may include a root mean square (RMS), an amplitude, a peak signal to noise ratio (PSNR), and a mean squared error (MSE) for the audio.

At step 708, an overall quality score for the video clip may be calculated. In accordance with an embodiment, the overall quality score for the multimedia content may be calculated based on the set of parameter quality scores for each of the plurality of frames associated with the multimedia content.

Additionally, at step 710, a report may be generated. The report may include a representation of the set of parameter quality scores for each frame associated with the multimedia content, and a representation of the overall quality score for the multimedia content. The report may be in a tabular format or a graphical format. The report may be displayed to the user via the display 114.

It is intended that the disclosure and examples be considered as exemplary only, with a true scope and spirit of disclosed embodiments being indicated by the following claims.

We claim:

1. A method of assessing quality of multimedia content, the method comprising:
   receiving, by a quality assessment device, a multimedia content, wherein the multimedia content is captured from a media device;
   generating, by the quality assessment device, a plurality of frames from the multimedia content, based on an attribute associated with the multimedia content;
   determining, by the quality assessment device, for each frame, a set of parameter quality scores corresponding to a set of quality parameters;
   calculating, by the quality assessment device, an overall quality score for the multimedia content based on the set of parameter quality scores for each of the plurality of frames associated with the multimedia content; and
   when a reference video is absent for the multimedia content,
      creating a distorted image from a frame of the plurality of frames, by adding noise to the frame;
      determining one or more Mean-Subtracted Contrast-Normalized (MSCN) coefficients on local spatial neighborhoods of the frame based on a comparison of the distorted image and a corresponding frame;
      generating feature vectors based on the one or more MSCN coefficients; and
      calculating the overall quality score for a video clip using the feature vectors.

2. The method as claimed in claim 1 comprising:
   selecting the set of quality parameters from a plurality of predefined quality parameters, based on a user input.

3. The method as claimed in claim 1 wherein the attribute associated with the multimedia content comprises:
   a size and a time duration of the multimedia content.

4. The method as claimed in claim 3 further comprising:
   determining frames per second (FPS) for the multimedia content, based on the attribute associated with the multimedia content; and
   generating the plurality of frames based on the FPS for the multimedia content.

5. The method as claimed in claim 1 wherein the multimedia content comprises one of a video clip and an image.

6. The method as claimed in claim 1, wherein the plurality of quality parameters comprise:
   a plurality of video quality parameters, wherein the plurality of comprise:
      a mean squared error (MSE), a peak signal to noise ratio (PSNR), a signal to noise ratio (SNR), a structure similarity index (SSIM), a mean-squared-error (MSE), a maximum absolute value (MAE), an aspect ratio, a Pearson's correlation coefficient (PCC), a brightness, a contrast, a blurriness, a blackness, and a mean absolute difference (MAD) for the video, and
   a plurality of audio quality parameters, wherein the plurality of audio quality parameters comprises:
      a root mean square (RMS), an amplitude, a peak signal to noise ratio (PSNR), and a mean squared error (MSE) for the audio.

7. The method as claimed in claim 1, further comprising:
   generating a report, wherein the report comprises:
      a representation of the set of parameter quality scores for each frame associated with the multimedia content; and
      a representation of the overall quality score for the multimedia content.

8. The method as claimed in claim 1, wherein the report is in one of:
   a tabular format, and
   a graphical format.

9. The method as claimed in claim 1, wherein the media device is one of:
   a mobile phone device,
   a Set-Top-Box (STB), and
   a television unit.

10. A system for assessing quality of multimedia content, the system comprising:
   a processor; and
   a memory communicatively coupled to the processor, wherein the memory stories a plurality of processor-executable instructions, which upon execution by the processor, cause the processor to:
      receive a multimedia content, wherein the multimedia content is captured from a media device;
      generate a plurality of frames from the multimedia content, based on an attribute associated with the multimedia content;
      determine, for each frame, a set of parameter quality scores corresponding to a set of quality parameters; and
      calculate an overall quality score for the multimedia content based on the set of parameter quality scores for each of the plurality of frames associated with the multimedia content; and
      when a reference video is absent for the multimedia content,
         create a distorted image from a frame of the plurality of frames, by adding noise to the frame;
         determine one or more Mean-Subtracted Contrast-Normalized (MSCN) coefficients on local spatial neighborhoods of the frame based on a comparison of the distorted image and a corresponding frame;

generate feature vectors based on the one or more MSCN coefficients; and calculate the overall quality score for a video clip using the feature vectors.

11. The system as claimed in claim 10 wherein the attribute associated with the multimedia content comprises a size and a time duration of the multimedia content, and wherein the plurality of processor-executable instructions further causes the processor to:

determine frames per second (FPS) for the multimedia content, based on the attribute associated with the multimedia content; and generate the plurality of frames from the based on the FPS for the multimedia content.

12. The system as claimed in claim 10, wherein the multimedia content comprises one of a video clip and an image, and wherein the plurality of quality parameters comprise:

a plurality of video quality parameters, wherein the plurality of video quality parameters comprise:

a mean squared error (MSE), a peak signal to noise ratio (PSNR), a signal to noise ratio (SNR), a structure similarity index (SSIM), a mean-squared-error (MSE), a maximum absolute value (MAE), an aspect ratio, a Pearson's correlation coefficient (PCC), a brightness, a contrast, a blurriness, a blackness, and a mean absolute difference (MAD) for the video, and a plurality of audio quality parameters, wherein the plurality of audio quality parameters comprises:

a root mean square (RMS), an amplitude, a peak signal to noise ratio (PSNR), and a mean squared error (MSE) for the audio.

13. The system as claimed in claim 10, wherein the plurality of processor- executable instructions further causes the processor to:

generate a report, wherein the report comprises:

a representation of the set of parameter quality scores for each frame associated with the multimedia content; and a representation of the overall quality score for the multimedia content, and wherein the report is in one of:

a tabular format, and a graphical format.

14. The system as claimed in claim 10, wherein the media device is one of:

a mobile phone device, a Set-Top-Box (STB), and a television unit.

15. A non-transitory computer-readable medium storing computer-executable instructions for creating a process plan, the computer-executable instructions configured for:

receiving a multimedia content, wherein the multimedia content is captured from a media device;

generating a plurality of frames from the multimedia content, based on an attribute associated with the multimedia content;

determining for each frame, a set of parameter quality scores corresponding to a set of quality parameters; and calculating an overall quality score for the multimedia content based on the set of parameter quality scores for each of the plurality of frames associated with the multimedia content; and when a reference video is absent for the multimedia content, creating a distorted image from a frame of the plurality of frames, by adding noise to the frame;

determining one or more Mean-Subtracted Contrast-Normalized (MSCN) coefficients on local spatial neighborhoods of the frame based on a comparison of the distorted image and a corresponding frame;

generating feature vectors based on the one or more MSCN coefficients;

calculating the overall quality score for a video clip using the feature vectors.

16. The non-transitory computer-readable medium of claim 15, wherein the computer-executable instructions further configured for:

selecting the set of quality parameters from a plurality of predefined quality parameters, based on a user input.

17. The non-transitory computer-readable medium of claim 15, wherein the attribute associated with the multimedia content comprises a size and a time duration of the multimedia content, and wherein the computer-executable instructions are further configured for:

determining frames per second (FPS) for the multimedia content, based on the attribute associated with the multimedia content; and generating the plurality of frames based on the FPS for the multimedia content.

18. The non-transitory computer-readable medium of claim 15, wherein the plurality of quality parameters comprise:

a plurality of video quality parameters, wherein the plurality of comprise:

a mean squared error (MSE), a peak signal to noise ratio (PSNR), a signal to noise ratio (SNR), a structure similarity index (SSIM), a mean-squared-error (MSE), a maximum absolute value (MAE), an aspect ratio, a Pearson's correlation coefficient (PCC), a brightness, a contrast, a blurriness, a blackness, and a mean absolute difference (MAD) for the video, and a plurality of audio quality parameters, wherein the plurality of audio quality parameters comprises:

a root mean square (RMS), an amplitude, a peak signal to noise ratio (PSNR), and a mean squared error (MSE) for the audio.

19. The non-transitory computer-readable medium of claim 15, wherein the computer-executable instructions further configured for:

generating a report, wherein the report comprises:

a representation of the set of parameter quality scores for each frame associated with the multimedia content; and a representation of the overall quality score for the multimedia content, wherein the report is in one of:

a tabular format, and a graphical format.

* * * * *